United States Patent [19]

Yokokura et al.

[11] Patent Number: 4,759,614
[45] Date of Patent: Jul. 26, 1988

[54] FERROELECTRIC LIQUID CRYSTAL ELEMENT WITH PARTICULAR ALIGNMENT FILM AND A METHOD FOR MANUFACTURING THE SAME

[75] Inventors: Hisao Yokokura; Katsumi Kondo, both of Hitachi; Yasuo Hanawa, Katsuta; Susumu Era, Hitachi; Kishiro Iwasaki, Hitachi-oota; Tadao Nakata, Katsuta; Masato Isogai, Hitachi; Teruo Kitamura, Katsuta; Akio Mukoh, Mito; Yasuhiko Kando, Mobara, all of Japan

[73] Assignee: Hitachi, Ltd., Tokyo, Japan

[21] Appl. No.: 883,952

[22] Filed: Jul. 10, 1986

[30] Foreign Application Priority Data

Jul. 10, 1985 [JP] Japan ................ 60-150259
Feb. 10, 1986 [JP] Japan ................ 61-25885

[51] Int. Cl.⁴ .................................. G02F 1/13
[52] U.S. Cl. .................. 350/350 S; 350/341
[58] Field of Search ..................... 350/341, 350 S

[56] References Cited

U.S. PATENT DOCUMENTS 4,367,924  1/1983  Clark et al. ................ 350/334
4,381,886  5/1983  Yokokura et al. ........... 350/341
4,508,429  4/1985  Nagae et al. ............... 350/350 S

FOREIGN PATENT DOCUMENTS

0091661A1 10/1983  European Pat. Off. .
0160302A2 11/1985  European Pat. Off. .
3427597A1  2/1985  Fed. Rep. of Germany .
3443011A1  6/1985  Fed. Rep. of Germany .
2101760A   1/1983  United Kingdom .

OTHER PUBLICATIONS

Clark et al., "Submicrosecond Bistable Electro-Optic Switching in Liquid Crystals", *Applied Phys. Lett.*, vol. 36, No. 11 (Jun. 1980), pp. 899–901.
Meyer et al., "Ferroelectric Liquid Crystals", *Le Journal De Physique*, Tome 36, Mar. 1975, pp. L-69-L-71.
Flatischler et al., "Thin Ferroelectric Liquid Crystal Cells with Surface-Induced Alignment...", *Molecular Crystals & Liquid Crystals*, vol. 131, pp. 21–46.

*Primary Examiner*—Stanley D. Miller
*Assistant Examiner*—Richard F. Gallivan
*Attorney, Agent, or Firm*—Antonelli, Terry & Wands

[57] ABSTRACT

The element comprises a pair of transparent substrates, a pair of light-transmitting electrodes each provided on the respective substrates, a ferroelectric liquid crystal layer disposed between the pair of substrates and orientation control films for the molecules of the ferroelectric liquid crystal provided between the electrodes and the ferroelectric liquid crystal layer. The orientation control film controls a tile angle of a biphenyle series nematic liquid crystal having biphenyl ring system below 1.5° and causes a uniform molecule orientation characteristic and a memory property for the ferroelectric liquid crystal element of smectic C* liquid crystal and having a liquid crystal layer thickness of even more than 4 μm.

26 Claims, 1 Drawing Sheet

FERROELECTRIC LIQUID CRYSTAL ELEMENT WITH PARTICULAR ALIGNMENT FILM AND A METHOD FOR MANUFACTURING THE SAME

The present invention relates to a novel ferroelectric liquid crystal element with a uniform molecule orientation characteristic and with a memory property, and a method for manufacturing the same.

BACKGROUND OF THE INVENTION

Conventional liquid crystal elements used for watches and electronic calculators mostly make use of displays operated by the twisted-nematic (TN) mode wherein a nematic liquid crystal is arranged in a twisted structure. The response speed in this mode is 20 ms at the most under the present technology. On the other hand, an attempt for a display using a smectic liquid crystal is being made. A liquid crystal having smectic C* phase or smectic H* phase exhibits a ferroelectric characteristic, and such liquid crystal has come to the fore since it was found by Meyer et al. (refer to Journal de Physique, Vol. 36, L69, 1975). Such liquid crystal has a responsiveness of less than 1 ms, as is reported by Clark et al (refer to Applied Physics Letters, Vol. 36, P. 899, 1980), and so it is expected as a liquid crystal which will be able to open up a new field in an application of liquid crystals.

Further, in the ferroelectric liquid crystal element, it is important to arrange molecules of the liquid crystal in parallel and a preferred direction to a substrate, and to provide the element with a memory property.

As conventional methods for orienting the molecules of the ferroelectric liquid crystal uniformly in parallel and in a preferred direction to the substrate are proposed an application of a strong magnetic field and an application of a shearing stress to the liquid crystal, and an orientation by a spacer edge (refer to, for example, Shizen, July, 1983, pp 36–46 and Optronics, September, 1983 pp 64–70). On the other hand, there are a silicon monoxide oblique vacuum evaporation method and an organic polymer film rubbing method which have conventionally been used for a molecule orientation control of nematic liquid crystals and cholesteric liquid crystals. In the case of ferroelectric liquid crystals, however, these methods are not effective for a uniform molecule orientation. Of various organic polymer films, a polymer of imide series presents a relatively uniform orientation. The polymer film of imide series, however, has a problem of not causing the memory property for the element. As for the memory property, a proposal has been made by N. A. Clark and S. T. Lagerwall in Applied Physics Letters, Vol. 36, P. 899, 1980 and U.S. Pat. No. 4,367,924. According to the proposal, however, the memory property cannot be obtained unless the gap between the substrates of the liquid crystal element is reduced to extremely small sizes such as 1 $\mu$m, and a practical liquid crystal element is not yet produced. No practical production example of the elements with such a thin liquid crystal layer thickness is reported, even with the TN element which has been put to a practical use, and a possibility of practical production of such elements even from now on is extremely low. This is because the liquid crystal layer is required to be formed with a uniform thickness whose error has to be controlled less than 10% throughout the whole area of the layer, and the thinner the thickness of the layer, the harder the control of the thickness.

At present, therefore, even for a ferroelectric liquid crystal element having a practical cell gap of more than 4 $\mu$m between the substrates, an orientation control film which satisfies the requirements of both uniform orientation and the memory property simultaneously has not been found out yet, and so it has been impossible to commercially manufacture ferroelectric liquid crystal elements by the conventional liquid crystal element manufacturing method.

Thus, the present inventors have studied various kinds of polymer films and inorganic films in order to find out the orientation control film which is capable of causing not only uniform molecule orientation but also the memory property for the element.

SUMMARY OF THE INVENTION

One object of the present invention is to provide a ferroelectric liquid crystal element using a smectic C* liquid crystal as a ferroelectric liquid crystal and having a uniform molecule orientation characteristic and having a stable memory property.

Another object of the present invention is to provide a ferroelectric liquid crystal element suited for a commercial mass production and a practical use, more specifically, to provide a ferroelectric liquid crystal element which is suited not only for the mass production, wherein the thickness of a liquid crystal layer is more than 4 $\mu$m, but also for a time sharing drive.

At present, conditions for causing the ferroelectric liquid crystal element to develop the memory property have not been clarified yet. However the ferroelectric liquid crystal molecules normally form spiral structures. The memory property is considered to be present where the spiral structures are unwound when an electric field is applied, and the unwound structures remain even when the electric field is removed. The present inventors assumed that the aforementioned condition may be achieved where the interaction between the molecules of the liquid crystal and the surface of the substrates for the element can be controlled to an appropriate level, and applied various kinds of polymers to the surface of the substrate for the element in order to study the correlation between the kinds of applied polymers and the memory property. The result of this study has led to the present invention.

More specifically, after having studied physical properties of various kinds of polymers and the memory property, the present inventors found out that a satisfactory memory property is obtained even for the ferroelectric liquid crystal element with a liquid crystal layer thickness of more than 4 $\mu$m when a polymer which causes a small orientation tilt angle for a nematic liquid crystal during a parallel orientation thereof, different from the ferroelectric liquid crystal which is used for the present invention, is used as an orientation control film for the ferroelectric liquid crystal element.

As a result, the orientation control film to be used for the present inventon is defined as one such that when nematic liquid crystals having biphenyl ring systems is enclosed and oriented in a cell in place of the ferroelectric liquid crystal, the tilt angle thereof shows less than 1.5° or more preferably less than 1°.

More specifically, such orientation control film is preferred to essentially consist of an organic polymer containing $SO_2$ radical therein. Especially, the polyimide, polyimide-siloxane, polyimide-isoindolquinazoline-dion, polyhydrazide imide, polyamide, and polyamide-imide prepared from diamine compounds and/or bishydrazide compounds and carboxylic acid compounds are preferred.

The orientation control film of a polymer containing $SO_2$ to be used for the present invention is produced by polycondensation of monomers.

As examples of the diamine compounds, there are 4,4'-di(m-aminophenoxy)diphenylsulfon, 4,4'-di(p-aminophenoxy)diphenylsulfon, 4,4'-di(o-aminophenoxy)diphenylsulfon, 4-amino-4'-aminophenoxy diphenylsulfon, 3-amino-3'-aminophenoxy diphenylsulfon, 2-amino-2'-aminophenoxy diphenylsulfon, 4,4'-diamino diphenylsulfon and 3,3'-diamino diphenylsulfon.

As examples of the bishydrazide compounds, there are 4,4'-di(m-hydrazidephenoxy)diphenylsulfon, 4,4'-di(p-hydrazidephenoxy)diphenylsulfon, 4,4'-di(o-hydrazide-phenoxy)diphenylsulfon, 4,4'-sulfonylbis(benzoic hydrazide) and 3,3'-sulfonylbis(benzoic hydrazide).

Furthermore, compounds obtained through polycondensation between the above explained diamine compounds containing the $SO_2$ radical and well known diamines such as 4,4'-diamino diphenyl ether, 4,4'-diamino diphenyl ether-3-carbon amide or diamino siloxane which is obtained through polycondensation of the following compounds may be used.

As examples of the tetracarboxylic dianhydride, another reactant for the polycondensation, there are pyromellitic dianhydride, 3,3',4,4'-benzophenonetetracarboxylic dianhydride, 3,3',4,4'-diphenyltetracarboxylic dianhydride, cyclopentanetetracarboxylic dianhydride, 1,2,5,6-naphthalenetetracarboxylic dianhydride, 2,3,6,7-naphthalenetetracarboxylic dianhydride, 2,3,5,6-pyridinetetracarboxylic dianhydride, 1,4,5,8-naphthalenetetracarboxylic dianhydride, 3,4,9,10-perylenetetracarboxylic dianhydride, 4,4'-disulfonyldiphtalic dianhydride, which are cyclic hydrocarbon tetracarboxylic dianhydrides used for synthesization of ordinary polyimides.

As examples of the 2–4 carboxylic halides, there are isophtalic halide, terephtalic halide, 4,4'-diphenyldicarboxylic halide, 4,4'-diphenyletherdicarboxylic halide, 4,4'-diphenylsulfondicarboxylic halide, malonic halide, succinic halide, adipic halide, sebacic halide, trimellitic halide and pyromellitic halide.

Furthermore, the tricarboxylic halide anhydrides are obtained, for example, by reacting tricarboxylic anhydride with thionyl halide. As examples of the tricarboxylic halide anhydrides, there are trimellitic halide anhydride, 2,3,6-naphthalenetricarboxylic halide anhydride, 2,3,5-naphthalenetricarboxylic halide anhydride, 2,2',3-biphenyltricarboxylic halide anhydride, 1,2,4-naphthalenetricarboxylic halide anhydride and 1,4,5-naphthalenetricarboxylic halide anhydride.

As the organic solvents, there are N-methyl-2-pyrrolidone, N,N'-dimethylacetamide, N,N'-dimethylformamide, dimethyl sulfoxide, hexamethylphosphoric amide, pyridine, quinoline, sulfolan, cyclohexane and methylene chloride.

The polymer containing $SO_2$ used for the orientation control film of the present invention is obtained through applying the polycondensed polyamic acid or polyamic hydrazide by an ordinary method, and thereafter through ring closing by heating to form polyimide, polyimide siloxane, polyimide-isoindol-quinazolinedion, polyhydrazide imide, polyamide or polyamide imide. Also, a solution of polyimide, polyimide siloxane, polyimide-isoindol-quinazoline-dion, polyhydrazide imide, polyamide or polyamide imide synthesized beforehand by ring closure reaction may be applied. Furthermore, catalysts may be used for increasing a degree of polymerization. For improving the properties to allow firm bonding and reliability of the orientation control film, it is preferable to use a silane coupling agent, or to form an inorganic insulating layer such as a layer of silicon dioxide, aluminum oxide or titanium dioxide on the electrodes and the substrate. The inorganic insulating layer is effective not only for an improvement of an electrical insulating ability of the liquid crystal element but also for preventing ions, such as those of sodium in the substrate glass, from being injected into the liquid crystal layer.

According to the present invention, the formation of the thin film of the polymer containing $SO_2$ on the substrate is generally performed by applying the solution of polymer or a precursor of the polymer through the brush applying method, dipping method, rotary application method, spray method or printing method, by removing the solvent through heat treatment and, if necessary, by heat-reacting. Methods for forming the thin film, however, are not necessarily limited to the aforementioned methods, and conventional thin film forming techniques such as vacuum evaporation method and spattering method may also be employed. The orientation control film is readily formed by rubbing the surface of the film of polymer containing $SO_2$ in one direction with a piece of cloth or the like.

As examples of the ferroelectric liquid crystals to be used under the present invention, there are the following compounds:

-continued

Among the above ferroelectric liquid crystals, one whose phase changes in the order of isotropic phase (I)→cholesteric phase (Ch)→smectic C* phase (Sc*) or isotropic phase (I)→smectic C* phase (Sc*) starting from a high temperature side is especially preferable. Such liquid crystal is preferred because of a higher capability for providing a practical gap between the substrates. As the liquid crystals falling under this category, there are those represented by the aforementioned structural formulas (a) through (g).

The aforementioned liquid crystals are some of the examples which are employed under the present invention, and the liquid crystals applicable to the present invention are not necessarily limited to such liquid crystals, and such liquid crystals may be used in combination of more than two of the above or in combination of one above and the other not exemplified above.

As for the display mode of the ferroelectric liquid crystal of the present invention, both birefringence mode and guest-host mode are used. Especially, in the case of guest-host mode, dichroic dyes may be used as a guest.

In the present invention, the memory property is caused because the orientation control film appropriately controls the orientation of the ferroelectric liquid crystal moles.

PREFERRED EMBODIMENTS OF THE INVENTION

Figure 1:
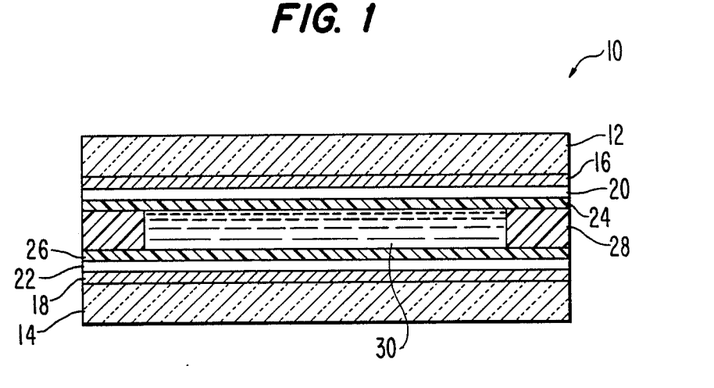
FIG. 1 shows a schematic sectional view of an example of a liquid crystal element according to the present invention.

FIG. 1 is a schematic sectional view of one embodiment of a ferroelectric liquid crystal element according to the present invention.

The ferroelectric liquid crystal element 10 is composed of a pair of transparent substrates 12 and 14; light-transmitting electrodes 16 and 18 provided on the respective substrates 12 and 14; light-transmitting insulating layers 20 and 22 covering the respective light-transmitting electrodes 16 and 18; orientation control films 24 and 26 according to the present invention (e.g., a polymer of imide series containing $SO_2$), provided on the respective light-transmitting insulating layers 20 and 22; a spacer 28 disposed between the substrates 12 and 14, capable of controlling the inter-substrate gap; and a ferroelectric liquid crystal 30 disposed between the pair of substrates 12 and 14, the periphery of which substrates is sealed air-tight.

The present invention will be explained in detail in reference to the following preferred embodiments of the invention, but the invention are not necessarily limited to those exemplified in the following.

EMBODIMENT 1

A polyamic acid varnish, obtained by polycondensing 0.1 mol of 4,4'-di(m-aminophenoxy)diphenylsulfon and 0.1 mol of 3,3',4',4'-diphenyltetracarboxylic dianhydride in a solution of N-methyl-2-pyrrolidone, is applied on the surface of the glass substrates with the transparent electrode by the spinner method, and the substrates with the coating of the varnish are baked for one hour at 200° C. to form the orientation control film. The thickness of this orientation control film measured by the probe type film thickness meter is 180 Å. The two pieces of the substrates processed in this way undergo the rubbing process by cloth. Then, the liquid crystal cell with a gap of 6 μm is assembled by employing glass fiber spacers, and the following compound as the ferroelectric liquid crystal is enclosed in the liquid crystal cell to form the liquid crystal element.

(Crystal $\xrightarrow{70°\ C.}$ Smectic C* phase $\xrightarrow{98°\ C.}$ Cholesteric phase $\xrightarrow{123°\ C.}$ Isotropic phase)

The molecule orientation characteristic of the ferroelectric liquid crystal element was assessed by a contrast ratio (that is ratio between two intensities of transmitted light, one when molecules of the ferroelectric liquid crystal align in one predetermined direction by an application of electric field of one polarity and the other when those align in the other predetermined direction by an application of electric field of the other polarity. The more uniform the molecular orientation the larger the value of the contrast ratio.

The memory property of the ferroelectric liquid crystal element was examined by a change in intensity of transmitted light when an electric field pulse was applied to the element through the pair of electrodes, in that, when the ferroelectric liquid crystal element has a memory property, the intensity does not substantially change until an electric field pulse of the other polarity is applied. On the other hand, when the element does not have the memory property, the intensity changes soon after the electric field is cut off, to return to an initial state of intensity.

The result of the evaluation of the above liquid crystal element indicates that the orientation characteristic is satisfactory as the contrast ratio is about 600, and the existence of the memory property is confirmed since no substantial change in intensity of transmitted light was observed.

The orientation control film used in this embodiment caused an orientation tilt angle of 0.8° for the nematic liquid crystal.

For the measurement of the tilt angle, E7, a product of BDH., was used as the nematic liquid crystal having biphenyl ring system of which tilt angle was measured through a transmitted light intensity change by the rotary crystal method while rotating the element. The same method of the tilt angle measurement was also applied to the embodiments below.

EMBODIMENT 2

The polyamic acid varnish obtained by the process of embodiment 1 was applied to the surfaces of the substrates, and thereafter the substrates were baked to form a polyimide film of 200 Å thick. The films on the surfaces of the two substrates were rubbed, and the liquid crystal cell with a gap of 4 μm was assembled by inserting glass fiber spacers between the substrates and a liquid crystal was enclosed in vacuum. As the ferroelectric liquid crystal, the compound indicated in embodiment 1 was used.

A contrast ratio of this embodiment was 580, and the element was found to have the memory property.

EMBODIMENT 3

An orientation control film was formed using the same solution of polymer as that used in embodiment 1, and the following ferroelectric liquid crystal was enclosed. Then, the orientation characteristic and the presence or absence of the memory property were examined for the liquid crystal element.

(Crystal $\xrightarrow{72° C.}$ Smectic C* phase $\xleftarrow{100° C.}$ Cholesteric phase $\xleftarrow{124° C.}$ Isotropic phase)

Contrast ratio: 550
Memory property: Present

EMBODIMENT 4

An orientation control film was formed by applying the solution of the same polymer used in embodiment 1 added with γ-aminopropyl triethoxy silane (0.1 wt%) in the same manner as that of embodiment 1 and a liquid crystal element prepared therefrom. After enclosing the following ferroelectric liquid crystal, the orientation characteristic and the presence or absence of the memory property were examined for the liquid crystal element.

(Crystal $\xrightarrow{17° C.}$ Smectic C* phase $\xleftarrow{36° C.}$ Smectic A phase $\xleftarrow{64° C.}$ Isotropic phase)

Contrast ratio: 520
Memory property: Present

In this embodiment, the nematic liquid crystal had a tilt angle of 0.9° to the orientation control film.

EMBODIMENT 5

A polyamic acid varnish, obtained by polycondensing 0.08 mol of 4,4'-di(p-aminophenoxy)diphenylsulfon, 0.02 mol of 4,4'-diamino diphenylsulfon, 0.07 mol of pyromellitic dianhydride and 0.03 mol of 3,3',4,4'-benzophenonetetracarboxylic dianhydride in the solution of N,N'-dimethylacetamide, was applied on the surfaces of the substrates, and baked to form an orientation control film of 150 Å thick. The films on the surfaces of the substrates were rubbed with cloth respectively; fine grains of aluminum were inserted between the substrates as a spacer; liquid crystal cells with gaps of 3 μm and 8 μm were assembled; and a liquid crystal was enclosed in vacuum in these cells. As the ferroelectric liquid crystals, a composite of the following two compounds was used. An orientation tilt angle of the nematic liquid crystal with respect to the orientation control film thus prepared was 1.0°.

(Crystal $\xrightarrow{62°C.}$ Smectic C* phase $\xrightarrow{96°C.}$ Cholesteric phase $\xrightarrow{118°C.}$ Isotropic phase)

Then, the orientation characteristic and the memory property of the elements were examined. The both elements indicated the same characteristics as follows:
Contrast ratio: 480
Memory property: Present

EMBODIMENT 6

A liquid crystal cell with a cell gap of 1.5 μm was prepared using the substrates prepared according to the process of embodiment 3, and a liquid crystal element was prepared by enclosing a mixture of the following liquid crystals:

The element had the memory property and a contrast ratio of 700.

EMBODIMENT 7

A polyamide, obtained by polycondensating 0.07 mol of 4,4'-di(m-aminiophenoxy)diphenylsulfon, 0.03 mol of 4-amino-4'-aminophenoxy diphenylsulfon and 0.1 mol of isophthalic dichloride in a solution of N-methyl-2-pyrrolidon, and the ferroelectric liquid crystal of embodiment 1 were used to prepare a liquid crystal element. An orientation tilt angle of the nematic liquid crystal to the orientation control film thus prepared was 1.5°. This element had the memory property and a contrast ratio of 420.

EMBODIMENT 8

A liquid crystal element similar to that of embodiment 5 was prepared using polyimide obtained by polycondensating 0.1 mol of 4,4'-di(m-aminophenoxy)diphenylsulfon and 0.1 mol of 3,3',4,4'-benzophenotetracarboxylic dianhydride in a solution of a mixture of cresol and toluene. This element was shown to have a satisfactory memory property and a contrast ratio of 650.
An orientation tilt angle of the nematic liquid crystal to the orientation control film thus prepared was 1.1°.

EMBODIMENT 9

A polyimide isoindol quinazoline film obtained by baking a polyamic acid varnish produced by polycondensating 0.09 mol of 4,4'-di(m-aminophenoxy)diphenylsulfon, 0.01 mol of 4,4'-diamino diphenyl ether-3-carbon amide, 0.05 mol of pyromellitic dianhydride and 0.05 mol of 3,3',4,4'-diphenyltetracarboxylic dianhydride in the solution of N-methyl-2-pyrrolidon was used. The thickness of the film measured 120 Å. The films on the surfaces of the two substrates were rubbed with cloth respectively. The glass fiber was inserted between the substrates as a spacer to assemble a liquid crystal cell with a gap of 3.5 μm. The ferroelectric liquid crystal used in embodiment 1 mixed with 2 wt% of dichroic dye (LCD-235, a product of Mitsubishi Kasei Co., Ltd.) was enclosed under vacuum in the cell. Then, the element was examined as to the orientation characteristic and the memory property. The result of the examination indicated that the element had the following characteristics:
Contrast ratio: 550
Memory property: Present

EMBODIMENT 10

An orientation control film was similarly formed on the substrate provided with an SiO₂ film under the electrode using the solution of polymer used in embodiment 5. A liquid crystal cell having a gap of 4.7 μm was assembled. The ferroelectric liquid crystal used in embodiment 5 was enclosed under vacuum in the cell. Then, the liquid crystal element was examined as to the orientation characteristic and memory property, and found to have a contrast ratio of 560 and a memory property.

EMBODIMENT 11

A liquid crystal element similar to one in embodiment 1 was prepared using a polymer obtained by polycondensing 0.1 mol of 4,4'-di(m-hydrazidephenoxy)diphenylsulfon and 0.1 mol of pyromellitic dianhydride in a solution of N-methyl-2-pyrrolidon. An orientation tilt angle of the nematic liquid crystal to the orientation control film thus prepared was 1.2°.
This element was shown to have a satisfactory memory property and a satisfactory contrast ratio of 420.

EMBODIMENT 12

A polyamic acid varnish, obtained by polycondensing 0.095 mol of 4,4'-di(m-aminophenoxy)diphenylsulfon and 0.005 mol of the following diamino siloxane compound;

0.05 mol of pyromellitic dianhydride and 0.05 mol of 3,3',4,4'-benzophenonetetracarboxylic dianhydride in the solution of N-methyl-2-pyrrolidon, was applied on the surfaces of the substrates, and baked to form polyimide siloxane films. The thickness of the film measured 210 Å. The films on the two substrates were rubbed with cloth respectively. Fine grains of aluminum was inserted between the substrates as a spacer to assemble a liquid crystal cell with a gap of 3.5 μm. A liquid crystal as a mixture of the ferroelectric liquid crystal of embodiment 5 and 3 wt% of dichroic dye of embodiment 9 was enclosed under vacuum in the cell. Then, the liquid crystal element was examined as to the orientation characteristic and the memory property, and the element was found to have a contrast ratio of 550 and a memory property. An orientation tilt angle of the nematic liquid crystal to the orientation control film thus prepared was 1.2°.

EMBODIMENT 13

An orientation control film of polyhydrazide imide was formed using a polyhydrazideamic acid varnish obtained by polycondensing 0.1 mol of 4,4'-di(m-hydrazidephenoxy)diphenylsulfon and 0.1 mol of 3,3',4,4'-diphenyltetracarboxylic dianhydride in the solution of N-methyl-2-pyrrolidon. The thickness of the formed film measured about 200 Å. The films on the two substrates were rubbed with cloth respectively. A glass fiber was inserted between the substrates as a spacer to assemble a liquid crystal cell with a gap of 3 μm. A liquid crystal was enclosed under vacuum in the cell. As the ferroelectric liquid crystal, one defined in embodiment 1 was used. The orientation tilt angle of the nematic liquid crystal to the orientation control film thus prepared was 1.3°.
Contrast ratio: 430
Memory property: Present

EMBODIMENT 14

An orientation control film of polyhydrazide imide was formed using a polyhydrazideamic acid varnish obtained by polycondensation of 0.07 mol of 4,4'-di(m-hydrazidephenoxy)diphenylsulfon, 0.03 mol of 4-amino-4'-aminophenoxy diphenylsulfon, 0.05 mol of pyromellitic dianhydride and 0.05 mol of 3,3',4,4'-diphenyltetracarboxylic dianhydride in a solution of N-methyl-2-pyrrolidon. The thickness of the formed film measured 150 Å. The films on the two substrates were rubbed with cloth respectively. A glass fiber was inserted between the substrates as a spacer to assemble a liquid crystal cell with a gap of 2.5 μm. The ferroelectric liquid crystal used for embodiment 1 was mixed with 3 wt% of the dichroic dye used for embodiment 9, and the mixture was enclosed under vacuum in the cell. The liquid crystal element was examined as to the orientation characteristic and the presence or absence of the memory property.
Contrast ratio: 500
Memory property: Present

EMBODIMENT 15

An orientation control film of polyhydrazide imide was formed using a polyhydrazideamic acid varnish obtained by polycondensing 0.095 mol of 4,4'-(m-hydrazidephenoxy)diphenylsulfon, 0.05 mol of diamino siloxane compound represented by the following structural formula:

0.05 mol of pyromellitic dianhydride and 0.05 mm mol of 3,3',4,4'-benzophenonetetracarboxylic dianhydride in a solution of N-methyl-2-pyrrolidon. The thickness of the formed film was 210 Å. The films on the two substrates were rubbed with cloth respectively. A glass fiber was inserted between the substrates as a spacer to assemble a liquid crystal cell with a gap of 3.0 μm. The liquid crystal defined for embodiment 4 mixed with 3 wt% of dichroic dye in embodiment 5 was enclosed under vacuum in the cell. Then, the liquid crystal element was examined as to the orientation characteristic and the presence or absence of the memory property.
Contrast ratio: 550
Memory property: Present

EMBODIMENT 16

A solution of a polymer, obtained by reprocessing a compound produced by polycondensing 0.1 mol of 4,4'-di(m-aminophenoxy)diphenylsulfon and 0.1 mol of isophthalic dihalide, was applied on the substrates, and baked to form an orientation control film of polyamide. The thickness of the formed film was about 200 Å. The films on the two substrates were rubbed with cloth respectively. A spacer of glass fiber was inserted between the two substrates to assemble a liquid crystal cell with a gap of 3 μm. A liquid crystal was enclosed under vacuum in the cell. As the ferroelectric liquid crystal, one the same as that used in embodiment 3 was used.
Contrast ratio: 380
Memory property: Present

EMBODIMENT 17

A polymer obtained by polycondensing 0.08 mol of 4,4'-di(m-aminophenoxy)diphenylsulfon, 0.02 mol of 4,4'-diamino diphenylsulfon, 0.07 mol of isophthalic halide and 0.03 mol of 4,4'-diphenylsulfondicarboxylic halide in a solution of N,N'-dimethylacetamide was applied on the substrates, and baked to form an orientation control film of polyamide. The thickness of the formed film was about 130 Å. The films on the two substrates were rubbed with cloth respectively. A spacer of glass fiber was inserted between the two substrates to assemble a liquid crystal cell with a gap of 2.5 μm. A ferroelectric liquid crystal was enclosed under vacuum in the cell. The ferroelectric liquid crystal the same as one used in embodiment 4 was used.
Contrast ratio: 350
Memory property: Present

EMBODIMENT 18

An orientation control film of polyamide imide was formed using a polyamic acid varnish obtained by polycondensing 0.08 mol of 4,4'-di(p-aminophenoxy)diphenylsulfon, 0.02 mol of 4,4'-diamino diphenylsulfon and 0.1 mol of 4-chloroformilphthalic anhydride in the solution of N,N'-dimethylacetamide. The thickness of the formed film was about 150 Å. A spacer of glass fiber was inserted between the two substrates to assemble a liquid crystal cell with a gap of 2.5 μm. A liquid crystal was enclosed under vacuum in the cell. The ferroelectric liquid crystal the same as one used in embodiment 4 was used.
Contrast ratio: 380
Memory property: Present

EMBODIMENT 19

Besides the cases of the foregoing embodiments, thermo-plastic polymers such as those shown in the following table were used as the orientation control films, and liquid crystal cells with a gap of 6 μm and a gap of 1.5 μm were prepared by the same process as in embodiment 1.

| Material of orientation control film angle | Orientation tilt |
| --- | --- |
| Polyacrylonitrile | 1.1° |
| Isobutylene-maleic anhydride copolymer | 1.1° |

-continued

| Material of orientation control film angle | Orientation tilt |
|---|---|
| Polybutadiene | 0.4° |

For the cell having the gap of 6 μm the liquid crystal compound used in embodiment 1 was enclosed, whereas the liquid crystal used in embodiment 6 was enclosed in the cell having the gap of 1.5 μm.

The above liquid crystal elements were examined as to the memory property, and they were found to have a satisfactory memory property with regard to all the orientation control films above.

EMBODIMENTS 20 THROUGH 22

The polyamic acid varnish or the polyhydrazideamic acid varnish used in the foregoing embodiments was applied on the surfaces of the substrates, and baked to form an orientation control film of polymer containing $SO_2$. The formed films were rubbed with cloth. A spacer was inserted between the substrates to assemble liquid crystal cells having different gaps respectively. The liquid crystals listed in Tables 1 were enclosed to prepare the ferroelectric liquid crystal elements according to the present invention. Each of these elements was examined as to the orientation characteristic and the presence or absence of the memory property.

Data concerning polymers containing $SO_2$, thicknesses of the film, gaps between the substrates, and liquid crystals or components of liquid crystals used are shown in Table 1.

TABLE 1

| Embodiment | Orientation control film Polymer | Film thickness (Å) | Gap between substrates (μm) | Ferroelectric liquid crystal | Memory property | Contrast ratio |
|---|---|---|---|---|---|---|
| 20 | Same as embodiment 1 | 200 | 16.0 | $C_6H_{13}O$—⟨O⟩—OCO—⟨O⟩—⟨O⟩—O—$\overset{*}{C}H$(CH$_3$)—$C_6H_{13}$<br>Dichroic dye (LCD-235, Product of Mitsubishi Kasei) 3 wt % | Present | 580 |
| 21 | Same as embodiment 1 | 200 | 12.3 | $C_7H_{15}O$—⟨O⟩—OCO—⟨O⟩—⟨O⟩—O—$\overset{*}{C}H$(CH$_3$)—$C_6H_{13}$<br>Dichroic dye 5 wt % | Present | 530 |
| 22 | Same as embodiment 1 | 200 | 8.2 | $C_8H_{17}O$—⟨O⟩—CH=N—⟨O⟩—OO$_2$—CH$_2$—$\overset{*}{C}H$(CH$_3$)—$C_2H_5$ (50 mol)<br>$C_8H_{17}O$—⟨O⟩—⟨O⟩—CO$_2$—CH$_2$—$\overset{*}{C}H$(CH$_3$)—$C_2H_5$ (50 mol) | Present | 460 |
| 23 | Same as embodiment 5 | 150 | 7.5 | $C_6H_{13}O$—⟨O⟩—OCO—⟨O⟩—⟨O⟩—O—$\overset{*}{C}H$(CH$_3$)—$C_6H_{13}$ (70 mol)<br>$C_8H_{17}O$—⟨O⟩—OCO—⟨O⟩—⟨O⟩—O—$\overset{*}{C}H$(CH$_3$)—$C_6H_{13}$ (30 mol) | Present<br>Present | 500<br>500 |
| 24 | Same as embodiment 9 | 120 | 20.0 | Same as embodiment 20 Dichroic dye 2 wt % | Present | 500 |
| 25 | Same as embodiment 8 | 280 | 6.2 | Same as embodiment 22 | Present | 410 |
| 26 | Same as embodiment 10 (SiO$_2$ film also used) | 120 | 10.3 | Same as embodiment 23 | Present | 430 |
| 27 | Same as embodiment 12 | 210 | 6.2 | Same as embodiment 23 | Present | 400 |
| 28 | Same as embodiment 13 | 250 | 9.8 | $C_6H_{13}O$—⟨O⟩—OCO—⟨O⟩—⟨O⟩—O—$\overset{*}{C}H$(CH$_3$)—$C_6H_{13}$ | Present | 370 |
| 29 | Same as embodiment 14 | 150 | 5.0 | $C_8H_{17}O$—⟨O⟩—OCO—⟨O⟩—⟨O⟩—O—$\overset{*}{C}H$(CH$_3$)—$C_6H_{13}$ | Presemt | 350 |
| 30 | Same as embodiment 15 | 210 | 11.5 | Same as embodiment 23 Dichroic dye 5 wt % | Present | 450 |
| 31 | Same as embodiment 16 | 200 | 5.3 | Same as embodiment 22 | Present | 330 |
| 32 | Same as | 150 | 7.1 | Same as embodiment 23 | Present | 320 |

TABLE 1-continued

| Embodiment | Orientation control film | | Ferroelectric liquid crystal | Memory property | Contrast ratio |
|---|---|---|---|---|---|
| | Polymer | Film thickness (Å) | Gap between substrates (μm) | | | |
| embodiment 18 | | | | | |

COMPARATIVE EXAMPLE 1

A liquid crystal element was prepared using an orientation control film of a polymer obtained by polycondensing 0.1 mol of 4,4'-diamino diphenyl ether and 0.1 mol of pyromellitic dianhydride in a solution of N-methyl-2-pyrrolidon, and employing the same process and the liquid crystal material the same as that used in embodiment 1.

The orientation tilt angle of the nematic liquid crystal to the orientation control film thus prepared was 2.0°.

The result of the evaluation of the above liquid crystal element indicated that no satisfactory memory property was present since the intensity of transmitting light varied and returned to an initial intensity after an electric field pulse was cut off. The contrast ratio was as low as 270; however, the orientation characteristic was satisfactory.

COMPARATIVE EXAMPLE 2

An orientation control film of polyimide was formed using a polyamic acid varnish obtained by polycondensing 0.1 mol of P,P'-diamino diphenyl methane and 0.1 mol of 3,3',4,4'-biphenyltetracarboxylic dianhydride in the solution of N,N'-dimethylacetamide. The thickness of the formed film was 150 Å. The films on the two substrates were rubbed with cloth respectively. A spacer of glass fiber was inserted between the substrates to assemble a liquid crystal cell having a gap of 4.0 μm. The ferroelectric liquid crystal used in embodiment 3 was enclosed under vacuum in the cell. Then, the orientation characteristic and the presence or absence of the memory property were examined.
Contrast ratio: 250
Memory property: Absent

COMPARATIVE EXAMPLE 3

A liquid crystal element similar to that of embodiment 6 was prepared but using a polyamide obtained by polycondensing 0.1 mol of P,P'-diamino diphenyl methane and 0.1 mol of isophthalic dichloride in a solution of N,N' dimethylacetamide, and the memory property of the element was measured.

The tilt angle of the nematic liquid crystal to the orientation control film thus prepared was 2.2°.

This element had a satisfactory orientation characteristic, but lacked the memory property.

COMPARATIVE EXAMPLE 4

A liquid crystal element similar as that of embodiment 5 was prepared but using a polymer obtained by polycondensing 0.1 mol of isophthalic hydrazide and 0.1 mol of 3,3',4,4'-benzophenonetetracarboxylic dianhydride in a solution of N-methyl-2-pyrrolidon, and the memory property of the element was measured.

The orientation tilt angle of the nematic liquid crystal to the orientation control film thus prepared was 1.8°.

This element had a satisfactory orientation characteristic, but lacked the memory property.

COMPARATIVE EXAMPLE 5

An orientation control film of polyamide was formed using a polyamic acid varnish obtained by polycondensing 0.1 mol of 4,4'-diamino diphenyl ether and 0.1 mol of isophthalic halide in a solution of N-methyl-2-pyrrolidon. The thickness of the formed film was 200 Å. The films on the two substrates were rubbed with cloth respectively. A spacer of glass fiber was inserted between the substrates to assemble a liquid crystal cell having a gap of 2.5 μm. The ferroelectric liquid crystal the same as one used in embodiment 1 was enclosed under vacuum in the cell, and the orientation characteristic and the memory property were examined.
Contrast ratio: 260
Memory property: Absent

COMPARATIVE EXAMPLE 6

An orientation control film of polyamide imide was formed using a polyamic acid varnish obtained by polycondensing 0.1 mol of P,P'-diamino diphenyl methane and 0.1 mol of 4-chloroformilphthalic anhydride in the solution of N,N'-dimetyl-acetamide. The thickness of the formed film was 150 Å. The films on the two substrates were rubbed with cloth respectively. A spacer of glass fiber was inserted between the substrates to assemble a liquid crystal cell having a gap of 4.0 μm. The ferroelectric liquid crystal the same as one used in embodiment 4 was enclosed under vacuum in the cell, and the orientation characteristic and the presence or absence of the memory property were examined.
Contrast ratio: 200
Memory property: Absent

COMPARATIVE EXAMPLES 7 THROUGH 10

Ferroelectric liquid crystal elements are prepared in accordance with comparative Examples 1-6; and data concerning orientation control films and their thicknesses, gaps between the substrates, and liquid crystals or components of liquid crystals used are shown in Table 2.

TABLE 2

| Comparative Example | Orientation control film | | Gap between substrates (μm) | Ferroelectric liquid crystal | Memory property | Contrast ratio |
|---|---|---|---|---|---|---|
| | Polymer | Film thickness (Å) | | | | |
| 7 | Same as comparative example 1 | 200 | 8.5 | Same as embodiment 28 Dichroic dye 2 wt % | Absent | 280 |
| 8 | Same as comparative | 150 | 5.0 | Same as embodiment 22 | Absent | 250 |

TABLE 2-continued

| Comparative Example | Orientation control film | | Gap between substrates (μm) | Ferroelectric liquid crystal | Memory property | Contrast ratio |
|---|---|---|---|---|---|---|
| | Polymer | Film thickness (Å) | | | | |
| 9 | Same as comparative example 3 | 120 | 10.3 | Same as embodiment 23 | Absent | 220 |
| 10 | Same as comparative example 5 | 200 | 6.5 | Same as embodiment 29 | Absent | 260 |

The result of the examination of the foregoing embodiments and the comparative examples indicates definitely that ferroelectric liquid crystal elements develop the memory property where orientation control films which cause the orientation tilt angle of less than 1.5° for the nematic liquid crystal having biphenyl ring system are used, and the memory property will not develop where the orientation tilt angle exceeds 1.5°. The result of the examination also indicates that the present invention enables the memory property to be developed not only for an element with a liquid crystal layer of 1 μm thick but also for a commercially usable element such as one with a liquid crystal layer of 4 μm thick.

The present invention provides the ferroelectric liquid crystal element with a uniform molecular orientation characteristic and the memory property even where the gap between the substrates is relatively large, for example more than 4 μm, and thus the present invention provides a highly practical display which has not been able to realized with the conventional art.

We claim:

1. A ferroelectric liquid crystal element comprising a pair of substrates having electrodes thereon, at least one of which substrates is transparent and is provided with a light-transmitting electrode, and a ferroelectric liquid crystal layer disposed between said pair of substrates, wherein at least one of said pair of substrates has formed thereon, between the liquid crystal layer and electrode on the at least one substrate, an orientation control film, said orientation control film being a film that controls an orientation tilt angle of a nematic liquid crystal having biphenyl ring, when the nematic liquid crystal is enclosed and oriented between the pair of substrates in place of the ferroelectric liquid crystal, to an angle below 1.5°, so as to provide a memory function for the ferroelectric liquid crystal element.

2. A ferroelectric liquid crystal element defined in claim 1, further characterized in that said orientation control film essentially consists of a polymer containing $SO_2$.

3. A ferroelectric liquid crystal element defined in claim 2 further characterized in that said polymer containing $SO_2$ is a polymer of imide series, imide siloxane series, imido-isoindol-quinazoline-dion series, hydrazide imide series, amide series or amide imide series.

4. A ferroelectric liquid crystal element defined in claim 3 further characterized in that said orientation control film of said polymer containing $SO_2$ is provided on said at least one of said pair of substrates having electrodes thereon with an insulating layer of inorganic material between the orientation control film and said at least one of said pair of substrates having electrodes thereon.

5. A ferroelectric liquid crystal element defined in claim 4 further characterized in that said insulating layer of inorganic material contains at least one of silicon dioxide, aluminum oxide and titanium dioxide.

6. A ferroelectric liquid crystal element defined in claim 2 further characterized in that said orientation control film of said polymer containing $SO_2$ is provided on said at least one of said pair of substrates having electrodes thereon with an insulating layer of inorganic material between the orientation control film and said at least one of said pair of substrates having electrodes thereon.

7. A ferroelectric liquid crystal element defined in claim 6 further characterized in that said insulating layer of inorganic material contains at least one of silicon dioxide, aluminum oxide and titanium dioxide.

8. A ferroelectric liquid crystal element defined in claim 2 further characterized in that said polymer containing $SO_2$ is admixed with a coupling agent of silane series.

9. A ferroelectric liquid crystal element defined in claim 2 further characterized in that said ferroelectric liquid crystal is one which exhibits isotropic phase→cholesteric phase→smectic C* phase or isotropic phase→smectic C* phase starting from a high temperature side.

10. A ferroelectric liquid crystal element defined in claim 9 further characterized in that said polymer containing $SO_2$ is a polymer of imide series, imide siloxane series, imido-isoindol-quinazoline-dion series, hydrazide imide series, amide series or amide imide series.

11. A ferroelectric liquid crystal element defined in claim 10 further characterized in that an insulating layer of inorganic material is provided between said orientation control film of said polymer containing $SO_2$ and said substrate with the light transmitting electrode.

12. A ferroelectric liquid crystal element defined in claim 1 further characterized in that each of said pair of substrates is transparent and is provided with a light-transmitting electrode, and that each of said pair of substrates is provided with said orientation control film formed thereon, postioned between the respective light-transmitting electrode and the ferroelectric liquid crystal layer.

13. A ferroelectric liquid crystal element defined in claim 1 further characterized in that each of the pair of substrates is provided with electrodes, and that each of said pair of substrates is provided with said orientation control film formed thereon, positioned between the respective electrodes and the ferroelectric liquid crystal layer.

14. A ferroelectric liquid crystal element defined in claim 1 further characterized in that the pair of substrates are spaced apart from each other so as to form a gap therebetween of at least 4 μm.

15. A ferroelectric liquid crystal element defined in claim 1 wherein said orientation control film is a film that controls an orientation tilt angle of a nematic liquid crystal having biphenyl ring, when the nematic liquid crystal is enclosed and oriented between the pair of substrates in place of the ferroelectric liquid crystal, to an angle below 1.0°.

16. A method for manufacturing a ferroelectric liquid crystal element comprising a pair of substrates at least one of which is transparent and is provided with a light-transmitting electrode and a ferroelectric liquid crystal disposed between said pair of substrates, characterized in that an $SO_2$-containing polyamic acid and/or $SO_2$-containing polyamic hydrazide varnish obtained by reacting diamine with $SO_2$ radical or dihydrazide with $SO_2$ radical with 2–4 carboxylic anhydride or 2–4 carboxylic halide is applied to at least one of said pair of substrates so as to be between said electrodes and said ferroelectric liquid crystal; a thin film of a polymer containing $SO_2$ is formed by heating said varnish at a temperature which permits ring closure of said varnish, said thin film of a polymer containing $SO_2$ being a film that forms an orientation control film that controls an orientation tilt angle of a nematic liquid crystal having biphenyl ring, when the nematic liquid crystal is enclosed and oriented between the pair of substrates in place of the ferroelectric liquid crystal, to an angle below 1.5°; and an orientation control film for said ferroelectric liquid crystal is formed by rubbing the surface of the thin film in a predetermined direction, whereby use of said thin film of an $SO_2$-containing polymer, in forming the orientation control film, provides a ferroelectric liquid crystal element having a memory function.

17. A method for manufacturing the ferroelectric liquid crystal element defined in claim 16 further characterized in that a light-transmitting insulating layer of inorganic material is formed on the substrate with the light-transmitting electrode; said varnish of polyamic acid containing $SO_2$ and/or polyamic hydrazide containing $SO_2$ is applied on the insulating layer of inorganic material; and said heating acts to cause ring-closing of the varnish.

18. A method for manufacturing the ferroelectric liquid crystal element defined in claim 17 further characterised in that said insulating layer of inorganic material contains at least one of silicon dioxide, aluminum oxide and titanium dioxide.

19. A ferroelectric liquid crystal element comprising light-transmitting electrodes respectively provided to a pair of substrates, at least one of which substrates is transparent, a light-transmitting insulating layer covering said light-transmitting electrodes, an orientation control film of a polymer of imide series, imide siloxane series, imide-isoindolquinazoline-dion series, hydrazide imide series, amide series, or amide imide series each containing $SO_2$ in its skeletal structure provided on said light-transmitting insulating layer, a spacer disposed between the substrates capable of freely controlling the intersubstrate gap and a ferroelectric liquid crystal disposed between said substrates, periphery of which substrates is air tightly sealed, wherein said orientation control film is a film that controls an orientation tilt angle of a nematic liquid crystal having biphenyl ring, when the nematic liquid crystal is enclosed and oriented between the pair of substrates in place of the ferroelectric liquid crystal, to an angle below 1.5°, so as to provide a memory function for the ferroelectric liquid crystal element.

20. A ferroelectric liquid crystal element defined in claim 19 further characterized in that said ferroelectric liquid crystal exhibits isotropic phase→cholesteric phase→smectic C* phase or isotropic phase→smectric C* phase starting from a high temperature side.

21. A ferroelectric liquid crystal element defined in claim 20 further characterized in that a dichroic dye is additionally disposed between the substrates, the dichroic dye being in admixture with the ferroelectric liquid crystal.

22. A ferroelectric liquid crystal element defined in claim 19 further characterized in that said polymer containing $SO_2$ is admixed with a coupling agent of silane series.

23. A ferroelectric liquid crystal element defined in claim 19 further characterized in that said light-transmitting insulating layer contains at least one of silicon dioxide, aluminum oxide and titanium oxide.

24. A ferroelectric liquid crystal element defined in claim 19 further characterized in that the pair of substrates are spaced apart from each other so as to form a gap therebetween of at least 4 μm.

25. A ferroelectric liquid crystal element defined in claim 19 further characterized in that the polymer containing $SO_2$ is polyimide containing $SO_2$.

26. A ferroelectric liquid crystal element defined in claim 19 wherein said orientation control film is a film that controls an orientation tilt angle of a nematic liquid crystal having biphenyl ring, when the nematic liquid crystal is enclosed and oriented between the pair of substrates in place of the ferroelectric liquid crystal, to an angle below 1.0°.

* * * * *